Aug. 4, 1970
F. W. GRAHAME
3,522,496
COMBINATION CAPACITOR HAVING A POROUS DIELECTRIC
STRIP BETWEEN A METALLIZED DIELECTRIC STRIP
AND A FOIL STRIP ELECTRODE
Filed Oct. 14, 1968
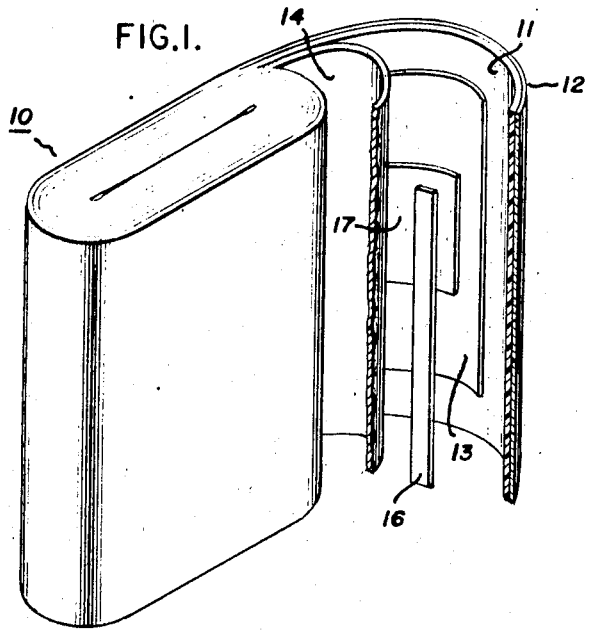
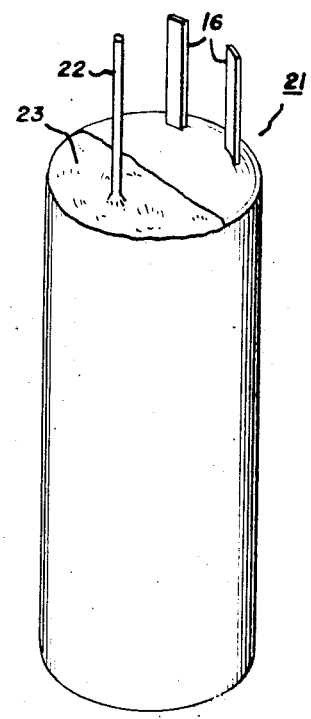
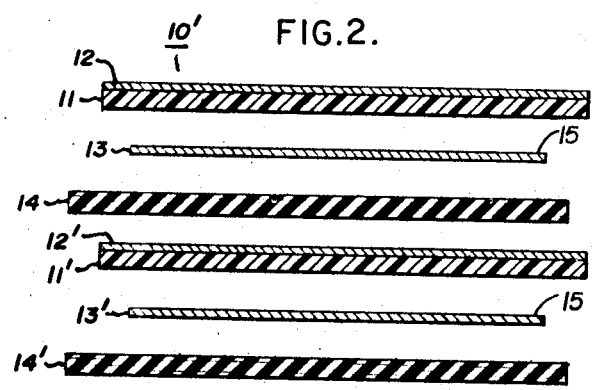
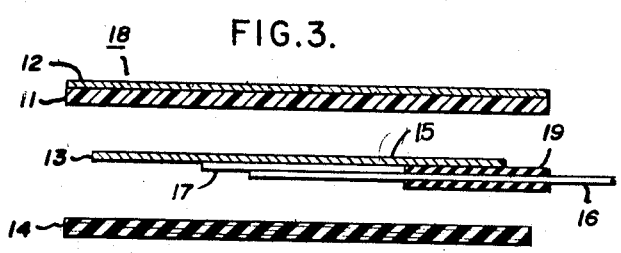
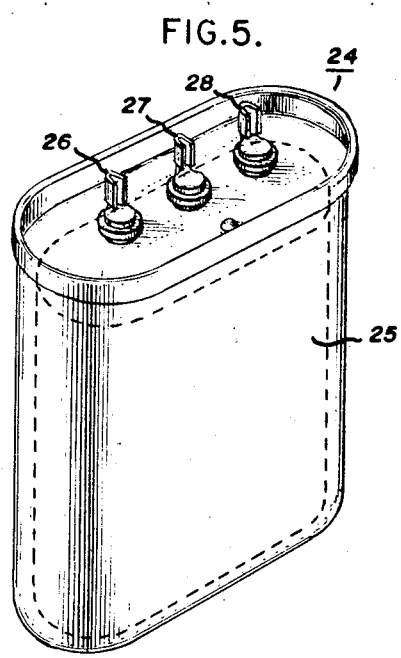
INVENTOR:
FREDERICK W. GRAHAME,
BY *James J. Lichiello*
HIS ATTORNEY.

United States Patent Office 3,522,496
Patented Aug. 4, 1970

---

3,522,496
COMBINATION CAPACITOR HAVING A POROUS DIELECTRIC STRIP BETWEEN A METALLIZED DIELECTRIC STRIP AND A FOIL STRIP ELECTRODE
Frederick W. Grahame, Glens Falls, N.Y., assignor to General Electric Company, a corporation of New York
Filed Oct. 14, 1968, Ser. No. 767,275
Int. Cl. H01g 1/14
U.S. Cl. 317—258          3 Claims

ABSTRACT OF THE DISCLOSURE

A combination capacitor roll section includes one electrode of a self-supporting nature such as a foil strip, and an opposite electrode as a metallized coating on a relatively non-porous dielectric strip such as a synthetic resin strip. A further relatively porous dielectric strip such as a paper strip is positioned between the electrodes so that, in each turn of the roll, the paper strip has one side adjacent the foil electrode and the opposite side adjacent the metallized layer. At the same time the paper dielectric strip is between two adjacent electrodes in the roll while the resin strip is between the next adjacent pair of electrodes.

BACKGROUND OF THE INVENTION

Field of the invention

This invention relates to combination roll type capacitors wherein one of the electrodes is a metal coating on a dielectric strip, and the other electrode is a self-supporting metal strip, and more particularly to such capacitors utilizing different kinds of dielectric material strips. Where resin and paper dielectric strips are employed, there is a paper dielectric strip between two adjacent electrodes, while between the next adjacent pair of electrodes there is a resin film dielectric strip.

Description of the prior art

A metallized electrode for a roll capacitor may be described as an ordinarily non-self-supporting thin layer of a suitable electrode material such as aluminum which is provided on and supported by a dielectric strip of for example, paper or resin. Metallized electrodes are desirable for use in various capacitors and particularly in ballast type capacitors for a number of reasons. For example, metallized electrodes, in addition to their known electrical self-healing properties, may be produced by various processes including metal evaporation, which can be controlled to provide permeability characteristics with respect to a dielectric liquid impregnant, for example, a mineral oil or hydrocarbon oil.

In a tightly wound capacitor roll section, it is difficult to provide full, complete, or essentially complete impregnation, through the roll edge to the interior or central portions of the roll when ordinarily relatively non-porous resins are used as the sole dielectric medium, and where the resin film utilized as the dielectric medium also includes a metallized coating thereon as an electrode.

A further disadvantage in the use of metallized electrodes is with respect to multi-section capacitors where there is a problem in longitudinally separating a strip of metallized material to serve as a pair of electrodes, with a common electrode, because, in the separation of a metallized strip, the dielectric strip is ordinarily also separated. Consequently, the above noted problems present serious limitations to the adaptability of metallized electrodes in dielectric liquid impregnated capacitors, particularly in multi-section capacitors.

SUMMARY OF THE INVENTION

Accordingly, it is an object of this invention to provide an improved metallized electrode capacitor.

It is a further object of this invention to provide an improved metallized electrode multi-section capacitor.

It is a still further object of this invention to provide an improved combination of different electrodes in a multi-section metallized electrode capacitor.

It is yet another object of this invention to provide an improved combination of different dielectrics in a metallized multi-section capacitor.

It is a further object of this invention to provide a dielectric liquid impregnable metallized electrode as the common electrode for a multi-section capacitor utilizing the combination of different electrodes and different and separated dielectrics.

It is a yet further object of this invention to provide a combination electrode, mixed dielectric, dielectric liquid impregnated, multi-section ballast type capacitor.

These and other objects of this invention will be better understood when taken in connection with the following descriptions of the drawings in which.

BRIEF DESCRIPTION OF THE DRAWINGS

FIG. 1 is an illustration of one preferred embodiment of this invention as a combination capacitor composite utilizing combination electrodes and combination dielectrics.

FIG. 2 is a partial, cross sectional view of a section of FIG. 1 where the individual self-supporting strips are illustrated in a spaced array for purposes of clarity.

FIG. 3 illustrates a lead arrangement for a capacitor of this invention wherein the self-supporting strips are shown in spaced array for the purpose of clarity.

FIG. 4 is an illustration of a multi-section capacitor of this invention where all leads project from the same end of the roll.

FIG. 5 is an illustration of a capacitor in a can.

Briefly described, in one preferred embodiment of this invention, a multi-section combination capacitor includes a synthetnc resin strip, having a metallized aluminum layer on one side thereof as a common electrode. On the other side of the resin strip there is a metal foil strip which is longitudinally separated for a multi-section capacitor. A paper strip is then positioned adjacent the foil strip to complete the assembly.

DESCRIPTION OF THE PREFERRED EMBODIMENTS

Referring now to FIG. 1, one exemplary embodiment of this invention is illustrated as a capacitor roll section 10 which is sometimes referred to as a combination or mixed-electrode and dielectric capacitor, or a combination capacitor.

A combination or mixed-electrode capacitor includes one electrode of a discrete self-supporting metal foil such as an aluminum foil, and a further different electrode which is prepared by metal coating or metallizing a suitable dielectric material. A combination capacitor may also have a mixed dielectric system including one dielectric in the form of a synthetic resin strip, which is the usual strip to be metallized, and a further different dielectric in the form of a paper strip. The synthetic resin strip is usually regarded, but is not necessarily, non-porous, and the paper strip is usually regarded, but is not necessarily, porous. The invention comprises the use of two dielectrics of substantially different absorptive characteristics with paper and resin being a prime example of differences in kind as well as characteristics. The preferred combination capacitor of this invention includes a mixed dielectric system where the mixed or different dielectrics do not appear together between spaced electrodes.

A preferred arrangement of mixed electrodes and mixed dielectrics in a combination capacitor section 10 is illustrated in FIG. 1. Section 10 includes a first dielectric strip 11 of any well known capacitor strip dielectric material including synthetic resins such as polyethylene terephthalate (Mylar), polysulfone, and preferably the polyolefins, particularly polypropylene. Dielectric strip 11 is covered or coated on one surface with a layer 12 of a suitable electrode metal, such as copper, zinc or aluminum, and preferably aluminum. Metal layer 12 is preferably a metallized layer which is integrally attached to the dielectric strip 11 for supporting purposes and may be provided by well known metal evaporation processes. Next adjacent the non-metallized side of dielectric strip 11 there is positioned a free, self-supporting aluminum foil strip 13 as the opposite electrode to aluminum layer 12. Next adjacent the aluminum foil 13 there is positioned a strip 14 of a porous material such as kraft paper or any other similar material which has enhanced absorptive properties with respect to the more common dielectric liquid impregnants. For enhanced impregnation, the aluminum foil 13, which is commercially available includes a shiny surface and a matte surface should have the matte surface as the undersurface 15.

In assembling the section 10, one or more paper strips 14 may be utilized to appear between the electrodes 12 and 13 in the roll, as well as one or more resin strips 11 may be utilized with only the outer most strip having a metal layer 12 thereon. In winding the section 10 with the paper strip 14 being the center of the revolution, a cross section of the roll (where, for the purpose of clarity the self-supporting strips are illustrated in spaced array) takes the appearance of 10' in FIG. 2. In referring to FIG. 2 it is specifically noted that between a pair of electrodes such as layer electrode 12 and foil electrode 13 there is positioned the absorbent paper strip dielectric 14, and the dielectric resin strip 11 appears as 11' between electrode 13' and the next turn of opposite electrode 12, appearing as 12'. In other words, foil electrode 13, within the roll, has on one side of it the difficult to impregnate resin strip 11, while on the other side of it a more readily impregnable paper strip 14.

In each instance however the resin strip is coated with a metallized layer which is predeterminedly impregnable by a dielectric liquid impregnant or is provided with suitable pores, or other fluid conducting means. Accordingly, where the roll must be impregnated primarily by subjecting the edges thereof to a dielectric liquid impregnant, the dielectric liquid impregnant may be taken up by the paper strip 14 to transmit the impregnant readily through the roll and through metal layer 12, which in turn permits the dielectric liquid impregnant to pass readily into the resin dielectric strip 11. This arrangement greatly facilitates impregnation of a capacitor utilizing a synthetic resin film dielectric. Without the paper strip, impregnation takes place only very slowly through the synthetic resin, or through the limited space between the synthetic resin and a closely adjacent foil. At the same time, it is specifically noted that where different (or mixed) dielectrics are utilized, as in FIGS. 1 and 2, the two dielectrics are not subject to the same electrical field since they both do not appear between the same electrodes. The two dielectric materials are not adjacent materials, but are separated materials provided between different electrodes alternately in the roll. There is always an electrode between and separating the synthetic resin strip 11 and the paper strip 14.

The invention as illustrated in FIGS. 1 and 2 is particularly applicable to ballast type capacitors, for example as found in U.S. Pat. 3,365,632, Grahame, assigned to the same assignee as the present invention. In ballast capacitors utilizing only a synthetic resin film as the dielectric material, gases are released during minor arcing in the capacitor and are not significantly absorbed by either the resin film or by the very small volume of free impregnant within the roll. Furthermore, these gases are released deep within the volume of the capacitor roll and often cannot rapidly escape and therefore cause corona to exist for long periods of time. Corona discharge leads to large scale dielectric degradation and early capacitor failure. The capacitor embodiment as illustrated in FIGS. 1 and 2 provides a more rapid and more complete impregnation of the capacitor roll to minimize the foregoing problems.

Ballast capacitors are often two section capacitors, in that one electrode is longitudinally separated to serve as a common electrode for two capacitor sections. In the instant invention as illustrated in FIGS. 1 and 2 the common electrode may be the coating layer 12. Therefore, the usual problem in metallized capacitors, of separating a metallized strip without separating the dielectric base, is removed in that the foil electrode 13 may be suitably and more expeditiously divided to provide the two sectional capacitor in combination with the common electrode 12.

One of the deterrents to full and complete impregnation is a resin film surface which clings or sticks to a foil surface, trapping gas, and preventing the penetration of impregnant at the interface. Greater difficulties are encountered where a foil electrode has a resin film adjacent both opposite surfaces. In the present invention, the resin strip 11, being between two electrodes, is readily impregnated because of the permeable nature of the adjacent metallized electrode.

In the manufacture of metallized film electrodes, it is a common practice to provide an uncoated edge or margins on the dielectric which is to be metallized, as noted for example in U.S. Pat. 3,292,061, Eustance, assigned to the same assignee as the present invention. Such margins are necessary in order to prevent short circuiting between the metallized layers at the roll edge. It is a specific advantage of the present invention that this uneconomic feature is eliminated because adjacent electrodes in a capacitor roll are separated either by a paper strip or a resin strip from an adjacent electrode, and more conveniently, the width of the foil electrode may be less than that of the metallized layer. This specific feature of this invention is more particularly claimed in copending application Ser. No. (36-CA-3011), filed concurrently herewith and assigned to the same assignee as the present invention.

It is quite desirable in metallized capacitors to have the leads project from one end, and this is particularly true in a case of ballast capacitors. However, because of margins and the concurrent expediency of opposite margins in the roll edges, metallized capacitors usually include a lead projecting from each end. In the usual practice a suitable metal is sprayed or coated over each edge of the capacitor roll section where a metallized edge is exposed, and a lead is joined to this sprayed metal. Such a process is illustrated and described for example in U.S. Pat. 3,256,472, Centurioni, assigned to the same assignee as the present invention. As indicated however in ballast capacitors and particularly multisection capacitors such as for example as shown in the noted U.S. Pat. 3,365,632, Grahame, it is desirable to have all leads project from one end.

In the present invention the metal spraying or schooping process may be eliminated for all leads except the common lead of the capacitor since all non-common leads project from the foil electrode 13 and may be assembled as usual tap strap leads. For example, as illustrated in FIG. 1, a suitable tap strap or wire lead 16 is affixed to a small square of aluminum foil 17 usually referred to as a flag. During the winding of the roll, the flag tap (16 and 17) is inserted in the roll in a desired position and serves as the electrode lead for the electrode foil 13. The lead for the aluminum layer 12 may be formed, in the usual manner as referred to in the Centurioni patent or by other suitable lead joining processes as applicable to metallized films, on the same end of the capacitor from which lead 16 extends.

The particular structure and arrangement for three leads for example to extend from one end of a multi-section capacitor is more clearly illustrated in FIGS. 3 and 4. Referring now to FIG. 3 a capacitor section 18 is illustrated with the various self-supporting strips shown in spaced array for the purpose of clarity. Paper strip 14 and foil electrode 13 are positioned in offset relationship with respect to a resin strip 11 and the aluminum layer 12 thereon. Next adjacent the electrode foil 13 there is positioned the tap strap 16, as illustrated in FIG. 1. Tap strap 16 may be connected directly to the aluminum foil 13 by welding, stapling, etc., or may be utilized in conjunction with a flag member 17 for frictional retention in the roll. In order to provide for the proper electrical connections to the aluminum layer 12 as well as to the electrode 13 when the section 18 is wound in roll form, insulation 19 may be provided on a section of tap strap 16 to insulate strap 16 from the overhanging aluminum layer 12. However, tap strap 16 may not be permanently shorted by contact with aluminum layer 12 due to the burn away (self-healing) features of the metallized layer, so that insulating layer 19 may be optional.

When section 18 of FIG. 3 is wound in a roll form, the lead connections thereto are illustrated more clearly in the roll section of FIG. 4. In FIG. 4 roll section 20 is illustrative of the roll form of section 18 of FIG. 3. At one end 21 of the roll section 20 of FIG. 4, a lead 22 is applied to the aluminum layer 12 by the aforementioned metal spraying or schooping process. A schooped metal layer 23 is provided over a half section of the roll and the lead 22 joined thereto by welding, soldering or other suitable joining methods. As illustrated in FIG. 2 for example the metallized layer 12 extends a short distance beyond paper strip 13 at one end of the roll so that it is exposed at the roll edge for schooping purposes. The porous strip 14 extends beyond the roll edge (determined by strip 11) at the other end of the roll section a larger distance for tap insulation purposes when a tap is used at that end. By having a portion of the end 21 unsprayed with any molten metal such as metal 23, one or more tap straps 16 may be brought out of the roll as described in FIG. 3.

This invention thus comprises, in a preferred form, a first dielectric material strip, for example a porous strip 14, one side of which is adjacent the layer electrode 12, and the other side of which is adjacent a foil electrode 13. The layer electrode is preferably on a synthetic resin strip such as polypropylene. The porous strip 14 may also be of a resin material which is porous or more porous by comparison to the metallized strip but may be either a woven or non-woven material.

The invention comprises in its broader form the use of two dielectric strips where one strip is more porous than the other. The two strips may be of the same or different material. They may be the same material where one has been made significantly more porous than the other. They may be different in the sense that they are different resins or for example they may be significantly different, i.e., one of resin and the other of paper. The difference in porosity should be of a substantial and significant degree for optimum results.

This invention as illustrated in FIG. 1 may include a number of other modifications in arrangement. For example, the foil electrode 13 need not be between the paper strip 14 and resin strip 13, but may be on the inside of the roll so that reading outwardly there is foil-paper-metal layer as compared to FIG. 1 which reads outwardly paper 14, foil 13 and resin 11. In either instance the roll may be wound with the foil strip 13 as the inside or outside strip of the roll, or with the paper strip 14 as the inside or outside strip of the roll. Strip 11 may also be metallized paper and strip 14 conversely may be a resin material strip.

Electrodes 12 and 13 may be replaced by other electrode structures. As one example foil electrode 13 may be replaced by a metallized layer on an adjacent strip, a pair of metallized strips, or a strip metallized on both faces, i.e., a doubly metallized strip, and the strips may be porous or non-porous. By the same token the layer 12 may comprises a separate metallized strip.

In all embodiments of this invention one or more of the strips 11, 12, 13 and 14 may be replaced by appropriate integral sandwich type structures, as illustrated for example in U.S. Pat. 3,363,156, Cox, assigned to the same assignee as the present invention.

This invention may be utilized as a dry capacitor but preferably as an impregnated capacitor. Accordingly, the impregnant may advantageously be a vegetable oil dielectric liquid impregnant including castor oil, cottonseed oil, and preferably castor oil. The liquid impregnant may also be mineral oil, silicone oil, and the halogenated hydrocarbons, specifically trichlorodiphenyl.

The embodiment of FIG. 4 for example may be advantageously employed as an impregnated capacitor when a suitable casing or housing is provided as illustrated in FIG. 5.

In FIG. 5 capacitor 24 includes a can member 25 which houses a capacitor roll section such as the section 10 and 20 of FIGS. 1 and 4. In the assembly of this capacitor 24, a roll section such as roll section 10 of FIG. 1 is first flattened into an oval configuration. Thereafter the schooping layer 23 and lead 22 are applied and the section is fitted into can 25. Both lead 16 and lead 22 are connected internally to terminals 26, 27 and 28 on can 25. The can 25 contains the dielectric liquid and is a sealed assembly for this purpose.

While the present invention has been described with reference to particular embodiments thereof, it will be understood that numerous modifications may be made by those skilled in the art without actually departing from the scope of the invention as disclosed. Therefore, the appended claims are intended to cover all such equipment variations as come within the true spirit and scope of the foregoing disclosure.

What is claimed as new and desired to be secured by Letters Patent of the United States is:

1. A dielectric liquid impregnated multi-section capacitor roll comprising
    (a) a metal coated dielectric strip serving as a common electrode to said sections and exposed at one end of said roll
    (b) a porous material strip next adjacent said metal coating
    (c) at least a pair of integral self-sustaining foil strips next adjacent said porous material strip and in spaced longitudinal relationship to provide a pair of capacitor sections together with said common electrode
    (d) and electrical leads for each of said sections extending from the same end of said roll as does the exposed metallized electrode.

2. The invention as recited in claim 1 wherein one end of said roll includes
    (a) a metallic coating over a portion thereof to engage said metallized coating
    (b) a lead member attached to said coating
    (c) and lead members in electrical engagement with said foil strips between the roll edges and extending from said end of said roll through the uncoated portion thereof.

3. The invention as recited in claim 1 wherein said capacitor is impregnated with a vegetable oil.

References Cited

UNITED STATES PATENTS

| | | | |
|---|---|---|---|
| 965,992 | 8/1910 | Dean | 317—260 |
| 1,938,806 | 12/1933 | Butler | 317—260 |
| 3,253,199 | 5/1966 | Cozens | 317—260 |
| 3,346,789 | 10/1967 | Robinson | 317—260 X |
| 3,411,104 | 11/1968 | Pintell | 317—260 X |

FOREIGN PATENTS

| | | |
|---|---|---|
| 705,353 | 3/1954 | Great Britain. |
| 723,693 | 2/1955 | Great Britain. |
| 755,615 | 8/1956 | Great Britain. |

OTHER REFERENCES

Grouse, R. A.: Metallized Products Co., Brochure, Norwalk, Conn., 1965, pp. 10 and 11.

ELLIOT A. GOLDBERG, Primary Examiner

U.S. Cl. X.R.

317—260

UNITED STATES PATENT OFFICE
CERTIFICATE OF CORRECTION

Patent No. 3,522,496        Dated August 4, 1970

Inventor(s) Frederick W. Grahame

It is certified that error appears in the above-identified patent and that said Letters Patent are hereby corrected as shown below:

Column 4, line 57, delete "(36-CA-3011)" and substitute -- 767,283 --

SIGNED AND SEALED
NOV 3 1970

(SEAL)
Attest:

Edward M. Fletcher, Jr.
Attesting Officer

WILLIAM E. SCHUYLER, JR.
Commissioner of Patents